(12) United States Patent
Schulte

(10) Patent No.: US 7,874,263 B2
(45) Date of Patent: Jan. 25, 2011

(54) ARRANGEMENT AND METHOD FOR MILKING A PLURALITY OF MILKING ANIMALS

(75) Inventor: Klaus Schulte, Mölnbo (SE)

(73) Assignee: Delaval Holding AB, Tumba (SE)

( * ) Notice: Subject to any disclaimer, the term of this patent is extended or adjusted under 35 U.S.C. 154(b) by 289 days.

(21) Appl. No.: 11/886,161

(22) PCT Filed: Mar. 9, 2006

(86) PCT No.: PCT/SE2006/000307

§ 371 (c)(1),
(2), (4) Date: May 28, 2008

(87) PCT Pub. No.: WO2006/098678

PCT Pub. Date: Sep. 21, 2006

(65) Prior Publication Data

US 2008/0282985 A1  Nov. 20, 2008

(30) Foreign Application Priority Data

Mar. 14, 2005  (SE) .................................. 0500571

(51) Int. Cl.
*A01K 1/12* (2006.01)
*A01J 5/00* (2006.01)
(52) U.S. Cl. ................ 119/14.02; 119/14.03; 119/14.08
(58) Field of Classification Search ............. 119/14.02, 119/14.03, 14.08, 14.18, 14.01
See application file for complete search history.

(56) References Cited

U.S. PATENT DOCUMENTS

| | | | | |
|---|---|---|---|---|
| 3,499,422 A | * | 3/1970 | Nelson | 119/14.08 |
| 3,566,841 A | * | 3/1971 | Gerrish et al. | 119/14.15 |
| 3,810,442 A | * | 5/1974 | Jacobs et al. | 119/14.03 |
| 3,841,756 A | * | 10/1974 | Grochowicz | 356/72 |
| 4,138,968 A | * | 2/1979 | Ostermann | 119/842 |
| 4,247,758 A | * | 1/1981 | Rodrian | 377/6 |
| 4,288,856 A | * | 9/1981 | Linseth | 119/841 |
| 4,362,127 A | | 12/1982 | Nielsen et al. | |
| 4,463,353 A | * | 7/1984 | Kuzara | 340/10.34 |
| 4,508,059 A | | 4/1985 | Anderson | |
| 4,517,923 A | * | 5/1985 | Palmer | 119/51.02 |

(Continued)

FOREIGN PATENT DOCUMENTS

EP  0 608 941 B1  12/1999

(Continued)

*Primary Examiner*—Rob Swiatek
*Assistant Examiner*—Ebony Evans
(74) *Attorney, Agent, or Firm*—Harness, Dickey & Pierce, P.L.C.

(57) ABSTRACT

An arrangement for milking a plurality of milking animals comprises an automated milking system (11) provided with a milking robot (13) for automatically milking a milking animal; a milking system (15) provided for batchwise milking of multiple milking animals; an identification arrangement (19, 21) provided for identifying each of the plurality of milking animals prior to being milked; decision means (23) connected to the identification arrangement for deciding, for each of the plurality of milking animals, whether that milking animal should be milked by the automated milking system or by the milking system for batchwise milking; and means connected (25) to the decision means for guiding each of the plurality of milking animals to the automated milking system or to the milking system for batchwise milking depending on the decision made for that milking animal.

33 Claims, 1 Drawing Sheet

U.S. PATENT DOCUMENTS

| | | | |
|---|---|---|---|
| 4,798,175 A | | 1/1989 | Townsend et al. |
| 5,000,119 A | | 3/1991 | Moreau et al. |
| 5,042,428 A | * | 8/1991 | Van der Lely et al. .... 119/14.08 |
| 5,183,008 A | * | 2/1993 | Carrano ...................... 119/840 |
| 5,241,924 A | * | 9/1993 | Lundin et al. ............ 119/51.02 |
| 5,259,334 A | | 11/1993 | Peacock |
| 5,285,746 A | | 2/1994 | Moreau |
| 5,533,469 A | * | 7/1996 | Touchton et al. ............ 119/721 |
| 5,579,719 A | * | 12/1996 | Hoff et al. ................. 119/51.02 |
| 5,628,284 A | | 5/1997 | Sheen et al. |
| 5,634,428 A | | 6/1997 | Koster |
| 5,653,192 A | | 8/1997 | Sheen et al. |
| 5,687,673 A | | 11/1997 | Bowers |
| 5,718,185 A | | 2/1998 | Pichler et al. |
| 5,743,209 A | * | 4/1998 | Bazin et al. .............. 119/14.08 |
| 5,791,283 A | * | 8/1998 | Schulte ....................... 119/14.1 |
| 5,950,562 A | | 9/1999 | Schulte et al. |
| 5,957,081 A | | 9/1999 | Van der Lely et al. |
| 5,959,526 A | * | 9/1999 | Tucker .................... 340/572.1 |
| 6,019,061 A | | 2/2000 | Schulte |
| 6,044,793 A | | 4/2000 | Van der Lely |
| 6,148,766 A | | 11/2000 | Van der Lely |
| 6,205,949 B1 | * | 3/2001 | van den Berg ........... 119/14.02 |
| 6,237,530 B1 | | 5/2001 | Van der Lely et al. |
| 6,334,406 B1 | | 1/2002 | Eriksson |
| 6,341,582 B1 | * | 1/2002 | Gompper et al. ............ 119/840 |
| 6,357,387 B1 | | 3/2002 | Johannesson |
| 6,394,028 B1 | * | 5/2002 | Birk ........................ 119/14.08 |
| 6,463,877 B1 | | 10/2002 | Van der Lely |
| 6,493,071 B2 | * | 12/2002 | van den Berg et al. ........ 356/72 |
| 6,526,919 B1 | * | 3/2003 | Schick ........................ 119/840 |
| 6,584,931 B1 | | 7/2003 | Kall et al. ................. 119/14.02 |
| 6,615,769 B2 | * | 9/2003 | Zhioua ....................... 119/666 |
| 6,705,247 B1 | * | 3/2004 | Heslin et al. ............. 119/14.02 |
| 6,779,484 B2 | * | 8/2004 | Guo ........................ 119/14.03 |
| 6,802,280 B2 | | 10/2004 | Mårtensson |
| 6,814,027 B2 | | 11/2004 | Hein et al. |
| 6,817,312 B2 | | 11/2004 | Battersby et al. |
| 6,860,226 B2 | * | 3/2005 | Nilsson ................... 119/14.02 |
| 6,899,044 B2 | * | 5/2005 | Thibault et al. .......... 119/51.02 |
| 7,530,327 B2 | * | 5/2009 | Voogd et al. ............. 119/51.02 |
| 2002/0033138 A1 | | 3/2002 | Brayer |
| 2002/0148408 A1 | * | 10/2002 | Gompper et al. ......... 119/14.14 |
| 2003/0101939 A1 | | 6/2003 | Van den Berg |
| 2003/0172876 A1 | | 9/2003 | Ornerfors |
| 2003/0188689 A1 | * | 10/2003 | Pratt ....................... 119/51.02 |
| 2004/0011294 A1 | * | 1/2004 | Guo ........................ 119/14.02 |
| 2004/0068940 A1 | | 4/2004 | Amir |
| 2004/0182325 A1 | * | 9/2004 | Sjolund et al. ........... 119/14.02 |
| 2008/0127896 A1 | * | 6/2008 | Petterson et al. ......... 119/14.02 |
| 2008/0189085 A1 | * | 8/2008 | Cook et al. ..................... 703/2 |

FOREIGN PATENT DOCUMENTS

| | | |
|---|---|---|
| EP | 1 213 676 A1 | 6/2002 |
| EP | 0 566 201 B2 | 7/2003 |
| EP | 0 832 558 B1 | 2/2006 |
| WO | WO 03/000044 A1 | 1/2003 |
| WO | WO 2004/068940 A1 | 8/2004 |

* cited by examiner

ARRANGEMENT AND METHOD FOR MILKING A PLURALITY OF MILKING ANIMALS

TECHNICAL FIELD OF THE INVENTION

The present invention relates generally to dairy farming, and more specifically to an arrangement and a method, respectively, for milking a plurality of milking animals.

DESCRIPTION OF RELATED ART AND BACKGROUND OF THE INVENTION

A large variety of such arrangements and methods are generally known in the art.

Fully automated milking systems provided with a milking robot for automatically attaching teat cups to the teats of the milking animals to be milked have been used during the last decade, preferably at smaller to mid-sized dairy farms. Automated milking systems are disclosed in U.S. Pat. Nos. 6,463, 877; 6,357,387; 6,334,406; 6,237,530; 6,148,766; 6,044,793; 5,957,081, in U.S. Pat. Application Publications Nos. 20030172876 A1; and 20030101939 A1, as well as in references therein.

Batchwise milking arrangements such as parallel stall, rotary and Herringbone parlors, on the other hand, have been used extensively for a long time. They are used in dairy farms of all sizes. Parallel stall configurations are disclosed in U.S. Pat. Nos. 5,634,428; 5,285,746; and 5,000,119, rotary configurations are disclosed in U.S. Pat. Nos. 6,817,312; 6,814, 027; 6,802,280; 5,718,185; and 5,687,673, and Herringbone parlors are disclosed in e.g. U.S. Pat. Nos. 5,718,185; 5,259, 334; 4,508,059; and 4,362,127.

Further, patent applications have been filed on several aspects of managing cows in large herds of livestock, see e.g. U.S. Pat. Nos. 6,019,061; and 5,950,562; International Patent Application Publications Nos. 2004/068940 A1; and 03/000044 A1, and European Patent Application Publications Nos. 1 213 676 A1; 0 832 558 A2; 0 608941 A1; and 0 566 201 A2.

SUMMARY OF THE INVENTION

By using fully automated milking systems a flexible and highly controlled and monitored animal management is obtained. Animals are milked, fed and taken care of on an animal individual basis to maximize milk production while good animal health is maintained. Typically, milk quality measuring equipment is provided for automatically analyzing the milk of an individual animal. Such analysis may even be performed on a teat individual basis. Other equipment may be provided for automatically sensing a condition, e.g. health condition, of the animal, for automatically treating the animal, or for automatically redirecting milk from the animal, e.g. depending on the quality of the milk.

However, the systems are costly and has this far not been fully adapted to large stocks of milking animals. For instance, it can be difficult to find a particular animal, which for example has to be examined or treated manually by the farmer. Besides, cow traffic patterns may become complex and difficult to control and monitor at large dairy farms.

Batchwise milking arrangements are highly cost efficient for large stocks of milking animals, wherein the animals are milked in groups. Typically, the animals in a group are milked and handled identically. The arrangements are less flexible and automatic animal individual treatments in the milking arrangements are difficult, if at all possible, to perform.

A general object of the present invention is therefore to provide an arrangement and a method for milking a plurality of milking animals, which are not only highly efficient but also flexible and can obtain a good overall control, monitoring, and treatment of the milking animals on an animal individual basis.

It is a further object of the invention to provide such an arrangement and such a method, which provide for high utilization of the milking systems used.

It is still a further object of the invention to provide such an arrangement and such a method, which are flexible, reliable, cost efficient, and easy to implement.

These objects, among others, are according to the present invention attained by the arrangement and the method as specified in the appended independent patent claims.

The inventive milking arrangement comprises an automated milking system provided with a milking robot; a batchwise milking system; an identification arrangement provided for identifying each of the milking animals prior to being milked; a decision part connected to the identification device for deciding, for each of the milking animals, whether that milking animal should be milked by the automated milking system or by the batchwise milking system; and a device such as a selective gate device connected to the decision means for guiding each of the milking animals to the automated milking system or to the batchwise milking system depending on the decision made for that milking animal.

By batchwise milking system is here meant a milking system wherein at least three animals are milked, preferably essentially simultaneously, in a single milking session.

Typically, the milking arrangement is provided in a loose housing area wherein the milking animals are allowed to walk about freely.

A gathering area may be provided, wherein the milking animals are gathered prior to being milked. The gathering of animals is normally performed at given moments such as e.g. two or three times a day, but may be performed more often or more rarely. The milking arrangement may be combined with other kind of milking systems. Even though the gathering may be performed automatically, it is commonly performed manually.

Alternatively, the milking animals present themselves at the identification arrangement on a voluntary basis, and are milked after having been guided to either one of the milking systems. Enticing means may be provided to entice the milking animals to visit the milking systems.

In most cases, the greater part of the animals are milked in the batchwise milking system, whereas a few particular animals are milked in the automated milking system.

Such particular animals may be animals that have previously been milked in the batchwise milking system, if it can be established that the udders of these animals were not emptied or milked completely during previous milkings. The automated milking system milks in such a case the udders of these animals completely, i.e. the udders are completely emptied.

Alternatively, or additionally, milking animals which are milked by the automated milking system may be animals that have been pre-selected, that produce low quantities of milk, that produce milk of low quality, or that are ill. The automated milking system may in such cases be arranged to automatically examine or treat the animals while being milked, or to separate the animals for manual inspection or treatment. In the latter instance the exit from the automated milking system may lead to an enclosed area, wherein the dairy farmer or a veterinarian will find the animals.

However, if the number of milking animals in the gathering area is below a threshold value, all animals may be milked by the automated milking system.

An advantage of the inventive milking arrangement is that it comprises two separate milking systems. That is, if one of the systems is out of order or is shut off for service or maintenance, all milking animals in the gathering can be guided to the other milking system.

The gathering area and/or collection area(s) at the exits of the milking systems may be provided with devices for supplying fresh water to animals in these areas.

Milking animals present in the gathering area that are not allowed to be milked in the inventive milking arrangement may be guided out from the arrangement either through the automated milking system or through selection gates in the gathering area. Enticing means such as supply of concentrated feed or fodder may be utilized to entice these animals to leave the gathering area.

Alternatively, these animals are not allowed to enter the gathering area. For instance a gate selection device provided with an animal identification device may be provided at the entry of the gathering area and animals identified as not allowed to be milked in the milking arrangement may be guided elsewhere by the gate selection device.

The milking arrangement of the present invention is particularly well suited to be used in dairy farms housing a large number of milking animals such as e.g. at least about 200 milking animals, but it may be applicable also to smaller dairy farms housing e.g. 50-200 milking animals.

Further characteristics of the invention and advantages thereof, will be evident from the following detailed description of preferred embodiments of the present invention given hereinafter and the accompanying FIG. 1, which is given by way of illustration only, and thus, is not limitative of the present invention.

DETAILED DESCRIPTION OF EMBODIMENTS

Figure 1:
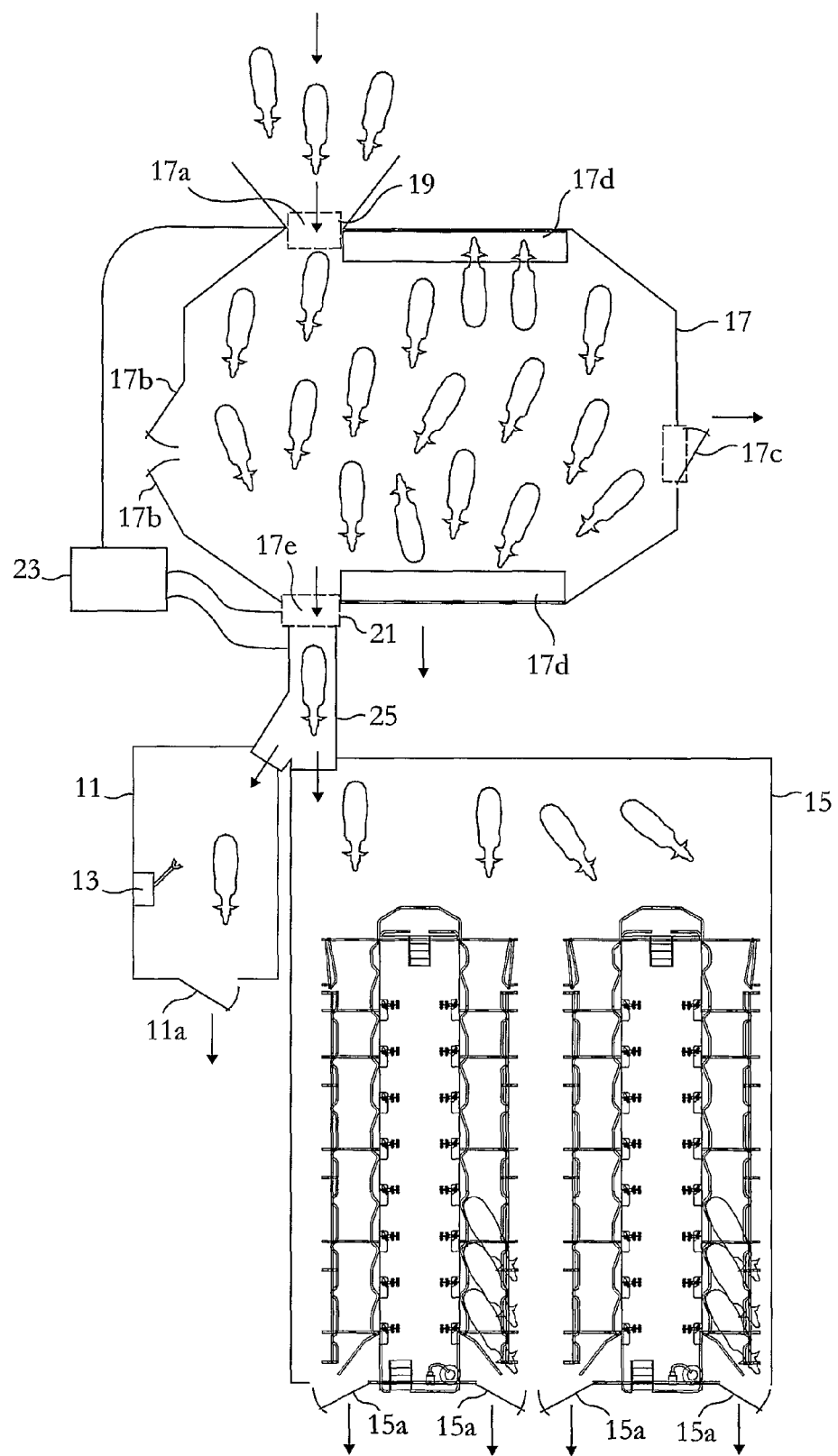
FIG. 1 illustrates schematically, in a top view, an arrangement for milking a plurality of milking animals according to an embodiment of the present invention.

FIG. 1 illustrates an arrangement for milking a plurality of milking animals, e.g. cows. The arrangement, which preferably is located in a loose housing area intended for a large number of milking animals, comprises an automated milking system 11 and a batchwise milking system 15.

The automated milking system 11 is provided for automatically milking at least one milking animal at a time and comprises a milking robot 13 for automatically attaching teat cups to the teats of the milking animal. The automated milking system 11 comprises automatic milk quantity measuring equipment, automatic milk quality measuring equipment, automatic animal health or condition measuring equipment, automatic animal examining equipment, automatic animal treatment equipment, and/or automatic milk redirection means as is known in the art.

It shall be appreciated by a person skilled in the art that the automated milking system may comprise more than one milking machine so that more than one milking animal can be milked at a time. One single milking robot may take care of the attachment of teat cups to the teats of several milking animals that are milked essentially simultaneously, or one milking robot may be provided for each milking machine of the automated milking system 11. If the automated milking system comprises more than one milking machine, these milking machines are preferably independent apparatuses capable of operating independently of one another.

The batchwise milking system 15 is provided for batchwise and preferably essentially simultaneous milking of a plurality, preferably a large number, of milking animals in a single milking session. The system 15 may be any of a rotary milking system, a parallel stall milking system, a tandem milking system, a Herringbone milking system, or a combination thereof, and may have e.g. 20-40 milking stalls or points.

Reference is made to the prior art milking systems cited in the introductory part of this patent document, the contents of which being hereby incorporated by reference.

The batchwise milking system 15 may be arranged for manual attachment of teat cups to teats of milking animals to be milked by the batchwise milking system 15, and may comprise devices for measuring the milk flow from, or the quantity of milk produced by, each of the milking animals milked by the batchwise milking system 15.

The automated milking system 11 and the batchwise milking system 15 are preferably capable of milking animals independently of one another.

Each of the automated milking system 11 and the batchwise milking system 15 for milking has a respective animal exit 11a, 15a leading back to the loose house area.

The inventive arrangement for milking comprises further a gathering area 17, an identification arrangement 19, 21, a decision part 23, and a guiding device 25.

The milking animals are typically gathered in the gathering area 17, which is optional. The gathering area is preferably an enclosed area provided with an entrance 17a, an emergency exit or fire escape 17b, an optional one-way exit gate 17c, a feed supply device 17d, and an exit 17e.

Preferably, the milking animals are animals entering the gathering area 17 e.g. through the entrance 17a during a given time period.

The emergency exit or fire escape 17b is opened to let the animals in the gathering area 17 out and back into the loose housing area in case of emergency or fire.

The optional one-way exit 17c leading back to the loose housing area is preferably an intelligent gate arrangement including an animal identification device. Animals that present themselves at the one-way exit 17c, are identified and allowed to leave the gathering area 17 provided that they are identified as not being allowed to be milked this time (see further details of the milking decision algorithm below).

In principle, the emergency exit or fire escape 17b, and the one-way exit 17c could be implemented as intelligent two-way gate arrangements, where animals are not only allowed to leave the gathering area 17 under certain conditions, but animals are also allowed to enter the gathering area through these gate arrangements after having been identified or counted.

The various exits, the milking system exits 11a, 15a, the emergency exit or fire escape 17b, and the one-way exit 17c, may instead of leading back to the loose housing area, lead to other areas, enclosures, stables, or buildings.

The feed supply device 17d is provided for supplying fresh water to animals in the gathering area 17 while waiting to be milked. Devices may be provided to assure that the water has sufficient quality and is of a sufficient amount. Regulation of water temperature, automatic monitoring of the water quality, automatic cleaning of the feed supply device 17d, and recordation of amounts of water consumed by each of the milking animals may be performed.

Animals that are to be milked are allowed to leave the gathering area 17 through the exit 17e when the gathering is finished, e.g. when the given time period has lapsed.

A further feed supply device may optionally be provided outside the exits 11a, 15a from the milking systems 11, 15 for supplying water, and optionally solid feed, to animals which have left the milking systems 11, 15.

The identification arrangement 19, 21 is provided for identifying each of the milking animals prior to being milked.

The arrangement 19, 21 comprises preferably one identification or counting device 19 at the entrance 17a to the gathering area 17 for identifying or counting each of the milking animals when entering the gathering area 17. Further, the arrangement 19, 21 comprises an identification device 21 at the exit 17e from the gathering area 17 for identifying each of the milking animals when leaving the gathering area 17. The identification devices may be implemented in any manner known per se by a person skilled in the art. Example implementations are given in U.S. Pat. Nos. 4,798,175 and 5,653,192, and in references therein, the contents of which being hereby incorporated by reference.

The decision part 23 is connected to the identification arrangement 19, 21 for deciding, for each of the milking animals in the gathering area 17 that should be milked, whether that milking animal should be milked by the automated milking system 11 or by the batchwise milking system 15. The decision part 23 is preferably computer implemented, and may in fact be a subroutine or a computer program of a larger computer program product implemented in a central processing device for the overall control of the inventive milking arrangement or the entire dairy farm.

The guiding device 25 is connected to the decision part 23 for guiding each of the milking animals to be milked to the automated milking system 11 or to the batchwise milking system 15 depending on the decision made by the decision part 23 for that milking animal. The guiding device 25 is arranged between the gathering area 17 and the milking systems 11, 15, and may be implemented as an intelligent selection gate arrangement in any manner known per se by a person skilled in the art. Example implementations are given in U.S. Pat. No. 5,628,284 and in International Patent Application Publication No. 2004/068940, and in references therein, the contents of which being hereby incorporated by reference.

The traffic flow of milking animals in the inventive milking arrangement is indicated by arrows in FIG. 1. In normal operation milking animals enter the gathering area 17 through its entrance 17a, are gathered in the gathering area 17 and are offered fresh water, are identified when passing through the selection gate arrangement 25, and are guided to either the automated milking station or to the batchwise milking system 15. Finally, the milking animals are leaving the arrangement through the exits 11a, 15a of the milking systems 11, 15.

A milking decision algorithm may be implemented in the above inventive arrangement for milking.

The decision part 23 connected for deciding is thus adapted to run a milking decision algorithm on each milking animal that is present in the gathering area 17 (or refer to a milking decision for each milking animal taken by other entity). The guiding device 25 is adapted to guide each milking animal that should not be milked out from the inventive milking arrangement and preferably back to the loose housing area. This may be achieved by means of guiding each of the milking animals that should not be milked to the automated milking system 11 and allowing them to pass through the automated milking system 11 without being milked. These milking animals exit the inventive milking arrangement through the exit 11a.

As described above, some of the milking animals not allowed to be milked may leave the gathering area 17 through the one-way exit 17c.

Alternatively, the inventive milking arrangement comprises an intelligent selection gate arrangement (not illustrated) at the entrance 17a of the gathering area 17, which is connected to the decision part 23. Milking animals that should not be milked may be guided away from the gathering area 17 by this intelligent selection gate arrangement at the entrance 17a of the gathering area 17. In this manner only animals allowed to be milked are allowed to enter the gathering area 17.

Still alternatively, the gathering area 17 is dispensed with, and the milking animals that should be milked are allowed to directly enter the guiding device 25 at 17e after having been identified by the identification device 21. The milking animals may present themselves at the guiding device 25 on a voluntary basis.

The decision part 23, which is adapted to decide, for each of the milking animals that should be milked, whether that milking animal should be milked by the automated milking system 11 or by the batchwise milking system 15, may base the decision on a number of different conditions.

For instance, the decision for each animal may be based on any of:

- a property of milk produced by the milking animal, e.g. a quantity or a quality of milk produced by the milking animal,
- a condition such as a health condition or a nutritional condition of the milking animal,
- a pre-selection, particularly a user entered pre-selection,
- the progress of lactation of the milking animal (where in the lactation curve the milking animal is),
- whether the milking animal is in heat;
- the time period lapsed, or the number of times milked, since the milking animal was lastly milked by either one of the milking systems, e.g. the automated milking system Normally, milking animals are guided to and milked by the batchwise milking system. However, there may be several exceptions from this.

The decision part 23 may be provided for deciding that a particular milking animal should be milked by the automated milking system 11 provided that the particular milking animal has previously been milked in the batchwise milking system 15, and it can be established that the udder of the particular milking animal was not emptied or milked completely during the previous milking. At the following milking of that particular milking, the automated milking system 11 is preferably arranged for milking the udder of the animal completely, i.e. emptying all milk in the udder. This may be performed on a teat individual basis, i.e. if the milking animal is a cow a single udder quarter may be fully emptied (if the udder quarter was not fully emptied in the previous milking).

Alternatively, or additionally, the decision part 23 may be provided for deciding that a particular milking animal should be milked by the automated milking system 11 provided that the particular milking animal produces low quantities of milk or produces milk of low quality, which may indicate that the particular milking animal is ill, or produces milk that is different from normal in any other manner. At the following milking of that particular milking animal, the automated milking system 11 is preferably arranged for automatically examining the milk from the animal, automatically treating the animal, and/or automatically redirecting the milk from the animal to e.g. other milk collecting recipient.

In some countries law regulations stipulate that particular milking equipment has to be used for the milking of cows that has a notable change in the composition or content of their milk. Thus, if the batchwise milking system is normally used, the automated milking system can be used for such milking animals.

Alternatively, or additionally, the decision part 23 may be provided for deciding that a particular milking animal should be milked by the automated milking system 11 provided that the particular milking animal needs to be examined or treated. At the following milking of that particular milking animal, the automated milking system 11 is preferably arranged for automatically examining or treating the milking animal. Alternatively, the dairy farmer is alerted, and the automated milking system 11 is optionally halted in order to allow the dairy farmer to see the particular milking animal for manual inspection or treatment.

If the number of milking animals in the gathering area 17 is very low, i.e. below a threshold value, the decision part 23 may decide that all milking animals should be milked by the automated milking system 11. This case may occur since some milking animals are usually milked more often than others.

Further, it shall be appreciated that if one of the milking systems 11, 15 is out of order or is shut off for service or maintenance, the decision part 23 may decide that all milking animals should be guided to the other milking system. Hereby, milking capacity and system security are increased.

Further, the decision part 23 may be provided for deciding, for each of the milking animals, whether that milking animal should be milked by the automated milking system 11 or by the batchwise milking system 15 depending on other conditions of the automated milking system 11 and/or of the batchwise milking system 15. Such conditions may comprise vacuum levels of the milking systems, the presence of milking meters, and their calibration, in the milking systems, the presence and/or calibration of other equipment of the milking systems, the presence of identification devices in the milking systems, etc.

The invention claimed is:

1. An arrangement for milking a plurality of milking animals, the arrangement comprising:
   an automated milking system configured to automatically milk at least one of the milking animals, the automated milking system including a milking robot configured to automatically attach teat cups to teats of the at least one milking animal;
   a milking system configured to batchwise milk at least two of the milking animals simultaneously, the automated milking system and the milking system for batchwise milking having different operating characteristics;
   an identification device configured to identify one of the milking animals prior to being milked;
   a processor connected to the identification device, the processor configured to determine whether the one milking animal should be milked by the automated milking system or by the milking system for batchwise milking; and
   a guiding device connected to the processor, the guiding device configured to guide the one milking animal to the automated milking system or to the milking system for batchwise milking, depending on the determination by the processor for the one milking animal.

2. The arrangement of claim 1, wherein the processor is configured to determine whether the one milking animal should be milked by the automated milking system or by the milking system for batchwise milking based on a property of milk produced by the one milking animal.

3. The arrangement of claim 1, wherein the processor is configured to determine whether the one milking animal should be milked by the automated milking system or by the milking system for batchwise milking based on a quantity of milk produced by the one milking animal.

4. The arrangement of claim 3, wherein the processor is configured to determine that the one milking animal should be milked by the automated milking system if the one milking animal has previously been milked by the milking system for batchwise milking and the udder of the one milking animal was not emptied during the previous milking.

5. The arrangement of claim 4, wherein the automated milking system is configured to complete milking of the udder of the one milking animal not emptied during the previous milking.

6. The arrangement of claim 1, wherein the processor is configured to determine whether the one milking animal should be milked by the automated milking system or by the milking system for batchwise milking based on a quality parameter of milk produced by the one milking animal.

7. The arrangement of claim 6, wherein the processor is configured to determine that the one milking animal should be milked by the automated milking system the one milking animal produces milk that is of low quality, indicates that the particular milking animal is ill, or is different from normal.

8. The arrangement of claim 1, wherein the processor is configured to determine whether the one milking animal should be milked by the automated milking system or by the milking system for batchwise milking based on a health condition of the one milking animal.

9. The arrangement of claim 8, wherein the processor is configured to determine that the one milking animal should be milked by the automated milking system if the one milking animal needs to be examined or treated.

10. The arrangement of claim 1, wherein the processor is configured to determine whether the one milking animal should be milked by the automated milking system or by the milking system for batchwise milking based on a previously-entered user selection.

11. The arrangement of claim 1, wherein the processor is configured to determine whether the one milking animal should be milked by the automated milking system or by the milking system for batchwise milking based on a condition of at least one of the automated milking system and the milking system for batchwise milking.

12. The arrangement of claim 11, wherein the processor is configured to determine that the one milking animal should be milked by the automated milking system if the milking system for batchwise milking is out of order or is to be shut off for service or maintenance, the processor further configured to determine that the one milking animal should be milked by the milking system for batchwise milking if the automated milking system is out of order or is shut off for service or maintenance.

13. The arrangement of claim 1, wherein the automated milking system includes milk quantity measuring equipment, milk quality measuring equipment, animal health measuring equipment, animal examining equipment, animal treatment equipment, and milk redirection equipment.

14. The arrangement of claim 1, wherein the milking system for batchwise milking is configured to permit manual attachment of teat cups to teats of the at least two milking animals to be milked by the milking system for batchwise milking.

15. The arrangement of claim 1, wherein the milking system for batchwise milking includes devices configured to measure milk flow from, and a quantity of milk produced by, each of the milking animals milked by the milking system for batchwise milking.

16. The arrangement of claim 1, wherein the milking system for batchwise milking includes at least one of a rotary milking system, a parallel milking system, a tandem milking system, and a Herringbone milking system.

17. The arrangement of claim 1, wherein the automated milking system and the milking system for batchwise milking include an animal exit leading to a loose house area provided for housing the milking animals.

18. The arrangement of claim 1, wherein the guiding device includes a selection gate device.

19. The arrangement of claim 1, further comprising:
a gathering area provided for gathering the milking animals prior to being milked.

20. The arrangement of claim 19, wherein the processor is configured to determine that the one milking animal should be milked by the automated milking system if a number of the milking animals in the gathering area is below a threshold value.

21. The arrangement of claim 19, wherein the gathering area includes an animal entrance connected to a loose housing area for housing the milking animals.

22. The arrangement of claim 19, wherein the milking animals are animals entering the gathering area during a given time period.

23. The arrangement of claim 19, wherein the gathering area at least one of an emergency exit, a fire escape, and a one-way exit gate.

24. The arrangement of claim 19, wherein the gathering area includes a device configured to supply water to the milking animals in the gathering area.

25. The arrangement of claim 19, wherein the identification device is configured to identify and count the milking animals entering the gathering area.

26. The arrangement of claim 19, wherein the identification is configured to identify the milking animals leaving the gathering area.

27. The arrangement of claim 19, wherein the processor is configured to run a milking decision algorithm on the one milking animal that is to enter the gathering area or is in said gathering area, and wherein the guiding device is configured to guide the one milking animal to a loose housing area for housing the milking animals, if the one milking animal is determined not to be milked.

28. The arrangement of claim 27, wherein the guiding device is configured to guide the one milking animal to the loose housing area via the automated milking system.

29. The arrangement of claim 19, further comprising:
a selection gate device at an entrance of the gathering area.

30. The arrangement of claim 29, wherein the selection gate device is arranged between the gathering area and the automated milking system and the milking system for batchwise milking.

31. The arrangement of claim 1, further comprising:
a device configured to supply at least one of water and solid feed to the milking animals which have left the milking systems.

32. A method for milking a plurality of milking animals, the method comprising:
identifying one of the milking animals prior to being milked;
deciding, for the one milking animal, whether the one milking animal should be milked by an automated milking system configured to automatically milk at least one of the milking animals or by a milking system configured to batchwise milk at least two of the milking animals simultaneously, the automated milking system including a milking robot configured to automatically attach teat cups to teats of the at least one milking animal; and
guiding the one milking animal to the automated milking system or to the milking system for batchwise milking based on the deciding for the one milking animal.

33. The method of claim 32, wherein the milking animals are gathered in a gathering area prior to being milked.

* * * * *